United States Patent [19]

Davies et al.

[11] Patent Number: 4,758,028
[45] Date of Patent: Jul. 19, 1988

[54] FIREWALL SEAL

[75] Inventors: Denys D. Davies, Pinner, England; Kenneth C. G. Thompson, St. Bruno, Canada

[73] Assignee: Pratt & Whitney Canada Inc., Longueuil, Canada

[21] Appl. No.: 79,618

[22] Filed: Jul. 30, 1987

[51] Int. Cl.$^4$ .............. F16J 15/02; F16L 5/02; F16L 41/08
[52] U.S. Cl. ...................... 285/189; 16/2; 277/12; 277/227; 277/234; 277/237 A; 285/413; 285/910; 428/121; 428/131; 428/137
[58] Field of Search .............. 277/1, 237 A, 237 R, 277/12, 227, 237 A; 285/189, 177, 192, 413, 205, 207, 208, 337, 368, 910, 411, 413; 16/2; 428/130, 131, 121, 225, 137; 174/48, 65 R; 248/56

[56] References Cited

U.S. PATENT DOCUMENTS

| | | | |
|---|---|---|---|
| 2,458,457 | 1/1949 | Wright | 277/237 A X |
| 3,162,412 | 12/1964 | McEntire | 285/192 X |
| 3,515,416 | 6/1970 | Pickert | 285/413 |
| 3,881,752 | 5/1975 | Fujishima | 285/192 X |
| 4,088,347 | 5/1978 | Bruggemann et al. | 285/910 X |
| 4,170,260 | 10/1979 | Rudd et al. | 285/337 X |
| 4,192,477 | 3/1980 | Decky et al. | 16/2 X |
| 4,267,995 | 5/1981 | McMillan | 248/56 |
| 4,268,947 | 5/1981 | Hilt | 16/2 X |
| 4,321,726 | 3/1982 | Rogers, Jr. et al. | 16/2 |
| 4,383,692 | 5/1983 | Proctor | 285/177 |

Primary Examiner—Allan N. Shoap

[57] ABSTRACT

A firewall seal in accordance with the present invention comprises a one-piece sheet of flexible fireproof material folded to form at least a two-ply seal component. Aligned openings are provided in each ply. At least one opening in each ply of the sheet is provided for passing a pipe, and a slit extends from the opening to the edge of the respective ply of the sheet, to allow assembly of the folded sheet on the pipe. The slits are staggered from one play to the other. The seal is provided on one side of the firewall only, and the folded sheet-seal components are covered by a pair of metal plates with each plate having a staggered slot for assembly on the pipe, and fastening means are provided for mounting the plates and folded sheet to the firewall.

4 Claims, 1 Drawing Sheet

FIREWALL SEAL

BACKGROUND OF THE INVENTION

1. Field of the Invention

The present invention relates to firewall seals, and in particular, firewall seals utilized in aircraft engines.

2. Description of the Prior Art

The firewall requirements for aircraft engines are set out in regulatory requirements of the Federal Aviation Administration as set out in 14 CFR (1-1-86 Edition) Federal Aviation Administration, DOT regulation #25.1191 Firewalls:

(a) Each engine, auxiliary power unit, fuel-burning heater, other combustion equipment intended for operation in flight, and the combustion, turbine, and tailpipe sections of turbine engines, must be isolated from the rest of the airplane by firewalls, shrouds, or equivalent means.

(b) Each firewall and shroud must be-
 (1) Fireproof;
 (2) Constructed so that no hazardous quantity of air, fluid, or flame can pass from the compartment to other parts of the airplane;
 (3) Constructed so that each opening is sealed with close fitting fireproof grommets, bushings, or firewall fittings; and
 (4) Protected against corrosion.

At present, fuel line seal arrangements include four superimposed seal elements. Each seal element must have at least an entry slit to allow it to be installed on a fuel line, and the seal elements are placed on either side of the firewall to seal off the opening. Such a seal might be mounted with the slits in the seal elements aligned, thus providing a fire path through the seal.

Present seals are often made of asbestos and silicone rubber. These materials present no fire safety problems, but asbestos fibers are said to be a potential health hazard.

SUMMARY OF THE INVENTION

It is an aim of the present invention to provide a firewall seal suitable to be foolproof in assembly by preventing the slits of different layers of seal elements from being aligned, thus eliminating the possibility of fire paths.

It is a further aim of the present invention to provide a firewall seal made up of fewer parts resulting in cost and weight savings.

A firewall seal in accordance with the present invention comprises a one-piece sheet of flexible fireproof material folded to form at least a two-ply seal component. Aligned openings are provided in each ply. At least one opening in each ply of the sheet is provided for passing a pipe, and a slit extends from the opening to the edge of the respective ply of the sheet, to allow assembly of the folded sheet on the pipe. The slits are staggered from one ply to the other.

In a more specific embodiment, the seal is provided on one side of the firewall only, and the folded sheet-seal components are covered by a pair of metal plates with each plate having a staggered slot for assembly on the pipe, and fastening means are provided for mounting the plates and folded sheet to the firewall.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
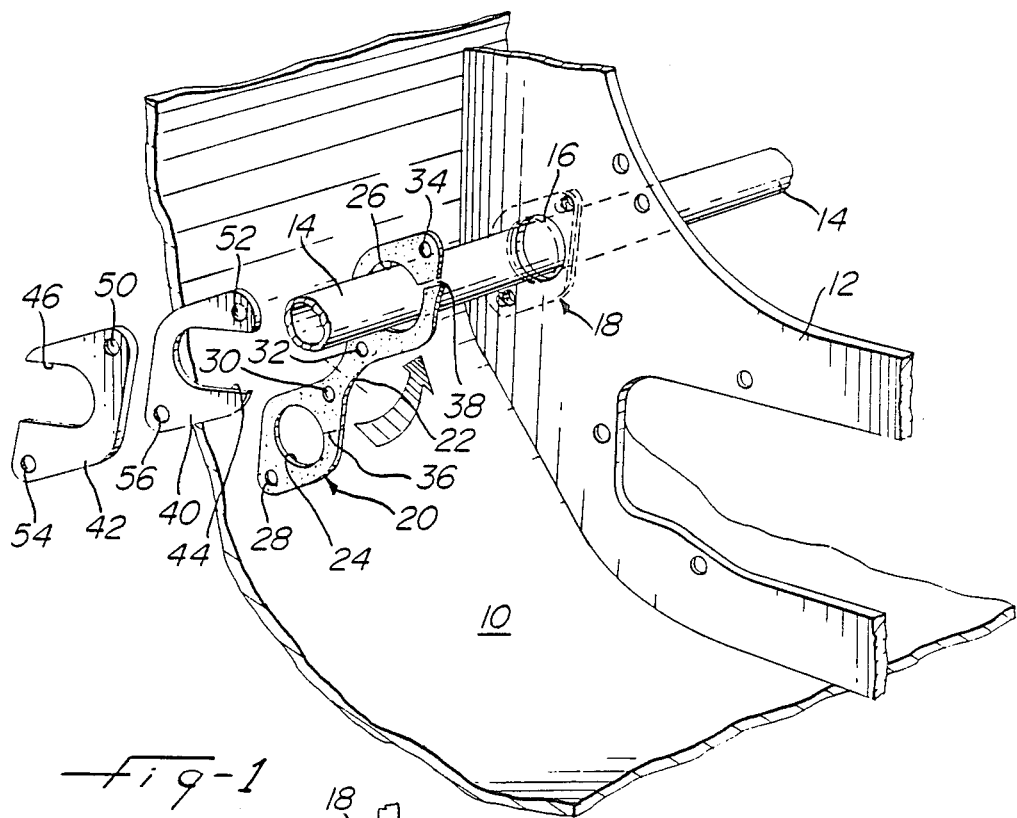
FIG. 1 is a fragmentary perspective view of a portion of a firewall and a seal in accordance with the present invention shown in the exploded view.

Referring now to the drawings, and in particular to FIG. 1, there is shown a turbine engine casing 10 and a firewall 12 with a fuel line 14 passing through an opening 16 in the firewall 12.

The firewall seal 18 includes a flexible sheet 20 of fireproof material, as will be described later. The sheet 20 is a one-piece blank foldable about a folding line 22 which is a symmetrical axis of the blank. The sheet 20 includes openings 24 and 26 which are adapted to coincide when the sheet 20 is folded about the line 22. Other openings 28, 30, 32, and 34 are provided for the purpose of allowing fastening means, such as bolts, to pass therethrough in the assembled position. A slit 36 is cut through the sheet between the peripheral edge thereof and the opening 24. Likewise, a slit 38 extends between the opening 26 and the edge of the sheet 20. The slits 36 and 38 are cut such that when the sheet is folded about the fold line 22, the slits appear staggered, such as shown in dotted lines in FIGS. 1 and 2.

Figure 2:
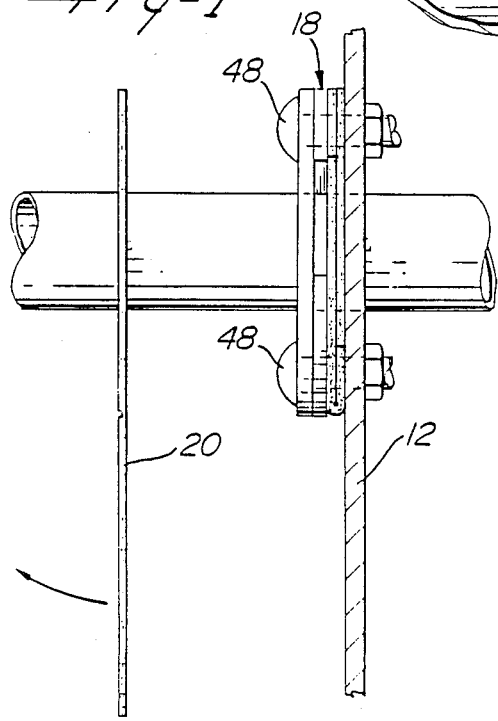
FIG. 2 is a fragmentary side elevation of the seal.

A pair of plates 40 and 42 each having a slotted opening 44 and 46 respectively complete the seal assembly. Bolts 48 pass through openings 50, 52 and 54, 56 respectively to sandwich the folded sheet 20 against the firewall 12, as shown in FIG. 2.

Figure 3:
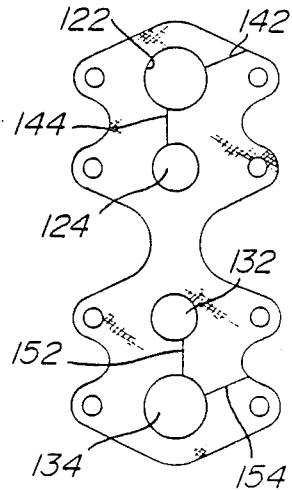
FIG. 3 is a plan view of a detail of a further embodiment of the present invention.

FIG. 3 shows an embodiment of the sheet which is identified 120. The sheet 120 has pairs of coinciding openings 122, 124, and 132, 134. Slits 142, 144, and 152, 154 are provided which are similar to the slits 36 and 38. The seal component 120 is utilized for a double line configuration which passes through a single or double opening in the firewall 12.

As can be seen from the above description, the fireproof sheet material 20 is constructed of one piece and can be folded over to form a two-ply seal component with the slits always being staggered to avoid accidental placement of the sheets whereby a fire path would be defined. It is also important that the material forming the sheet 20 or 120 be chosen to meet the regulatory requirements set out previously in this description.

In order to determine the suitability of the material, tests in accordance with the procedures set out in FAA "Power Plant Engineering Report No. 3A" will be followed. In such tests, flame temperatures of 2000° F. plus or minus 150° F. at a point 4 inches from a test burner outlet is used for a period of 15 minutes. The burner outlet is placed roughly 4 inches from the firewall opening over which the heat seal is mounted with the heat seal on the opposite surface of the firewall so that most of the sheet 20 is exposed through the opening to the flame.

From these tests, several materials were tried, and most were rejected as not meeting the tests which must last at least 15 minutes. The material which was selected as being the best material for the seal component 20 is a fiberglass material sold under the trade mark "VITON" by E. I. du Pont de Nemours. Any other suitable materials which are chemically resistant, do not flame, and do not pass the flame through in the test would be suitable. It has been found that such material must be a woven material with a tight weave.

We claim:

1. A firewall seal in accordance with the present invention comprising a one-piece sheet of flexible fireproof material folded to form at least a two-ply seal component and at least one metal plate with fastening means for mounting the metal plate and sandwiching the seal component against a firewall, wherein the firewall includes an opening and a pipe passing through the opening, the flexible fireproof material having at least one opening in each ply of the sheet for passing the pipe therethrough, and a slit extending from the opening to the edge of the ply of sheet material to allow assembly of the folded sheet on the pipe, the slits being staggered from one ply to the other.

2. A firewall seal as defined in claim 1, wherein the seal component is provided on one side of the firewall only and a pair of metal plates are provided for mounting the seal component against the firewall, with each plate having a staggered slot for assembly on the pipe and fastening means are provided for mounting the plates and the folded sheet to the firewall.

3. A firewall seal as defined in claim 1, wherein the sheet is folded symmetrically about a fold line with the openings in each sheet coinciding with the openings in one ply of the folded sheet coinciding with the openings of the other ply, with the exception that the slits, when folded, are staggered.

4. A firewall seal as defined in claim 3, wherein the material of the sheet is a woven flexible fiberglass material capable of withstanding a flame at 2000° F. for a period of 15 minutes without flaming or passing flame therethrough.

* * * * *